(12) United States Patent
Hendel

(10) Patent No.: US 6,633,946 B1
(45) Date of Patent: Oct. 14, 2003

(54) FLEXIBLE SWITCH-BASED I/O SYSTEM INTERCONNECT

(75) Inventor: Ariel Hendel, Cupertino, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/408,390

(22) Filed: Sep. 28, 1999

(51) Int. Cl.⁷ .............................................. G06F 13/00
(52) U.S. Cl. ......................... 710/317; 710/316; 710/38
(58) Field of Search ............................... 710/316, 317, 710/36, 37, 38; 307/263, 384; 709/225, 226

(56) References Cited

U.S. PATENT DOCUMENTS

| | | | |
|---|---|---|---|
| 4,821,034 A | | 4/1989 | Anderson et al. |
| 4,862,452 A | * | 8/1989 | Milton et al. ................ 370/263 |
| 5,717,871 A | * | 2/1998 | Hsieh et al. ................. 710/317 |
| 5,784,576 A | * | 7/1998 | Guthrie et al. .............. 710/302 |
| 5,815,647 A | * | 9/1998 | Buckland et al. ................ 714/3 |
| 6,138,185 A | * | 10/2000 | Nelson et al. ................. 710/33 |
| 6,243,787 B1 | * | 6/2001 | Kagan et al. ................ 710/263 |
| 6,421,769 B1 | * | 7/2002 | Teitenberg et al. .......... 711/170 |
| 6,438,128 B1 | * | 8/2002 | Kashyap ..................... 370/389 |

OTHER PUBLICATIONS

AMCC (Device Specification), 18pp., Sep. 15, 1998, http://www.amcc.com.
"Next Generation I/O Link Architecture Specification: Link Specification", 66pp., Oct. 30, 1998, http://www.intel.com.
"I/O The Next Generation", 66pp., 1998, http://www.intel.com.
"NGIO Architecture Overview", 30pp., 1998, http://www.intel.com.

* cited by examiner

Primary Examiner—Sumati Lefkowitz
Assistant Examiner—X. Chung-Trans
(74) Attorney, Agent, or Firm—Blakely, Sokoloff, Taylor & Zafman (57) ABSTRACT

An apparatus is described comprising: a switch for providing a plurality of communication channels between a plurality of nodes; and a crossbar switch communicatively coupled between the switch and the nodes for allocating one or more of a plurality of links to each of the nodes.

Additionally, in a system including a switch for providing a plurality of communication channels between a plurality of nodes, a method is disclosed comprising the steps of: determining bandwidth requirements of each node in the system; and allocating links to the nodes based on the bandwidth requirements.

30 Claims, 7 Drawing Sheets

FLEXIBLE SWITCH-BASED I/O SYSTEM INTERCONNECT

BACKGROUND OF THE INVENTION

1. Field of the Invention

This invention relates generally to the field of computer and network bus architectures. More particularly, the invention relates to an improved point-to-point link topology for transferring data within computer and/or network I/O systems.

2. Description of the Related Art

In the context of computer systems and networks, buses are well-defined physical interfaces between system components. Sometimes the interface is used exclusively between internal components (referred to as a "non-exposed interface"), while in other cases the interface is exposed in the form of connectors or bus slots to provide some degree of modularity. Modularity is the ability to modify the system by adding/removing modules or functions (e.g., adding/removing I/O cards).

Beyond the physical characteristics (i.e., the electrical and mechanical characteristics), a bus may also be defined based on the specific manner in which it transmits data to and from components. In other words, a bus may define the behavior of the interfacing components at higher levels of abstraction than a mere physical connection. This level of abstraction varies widely based on the particular bus involved (e.g., some buses are defined by highly specific communication protocols, transactions, associated memory spaces . . . etc).

A very popular model for computer system buses has been the broadcast multi-point bus. This model is based on the principle that every component on the bus can hear every other component. It has traditionally been implemented as a "passive" bus (i.e., the bus itself is a set of passive electrical traces, and only the interfacing components are electrically active). Typically, only one component on a broadcast bus may transmit data at any given time. As such, when a particular component needs to transmit/receive data over the bus, it must send a request to use the bus to some type of bus arbitration mechanism. When/if the bus is available, the arbitration mechanism will temporarily assign control of the bus to the requesting component. One exemplary bus arbitration configuration is referred to as a "multi-master broadcast bus."

Figure 1:
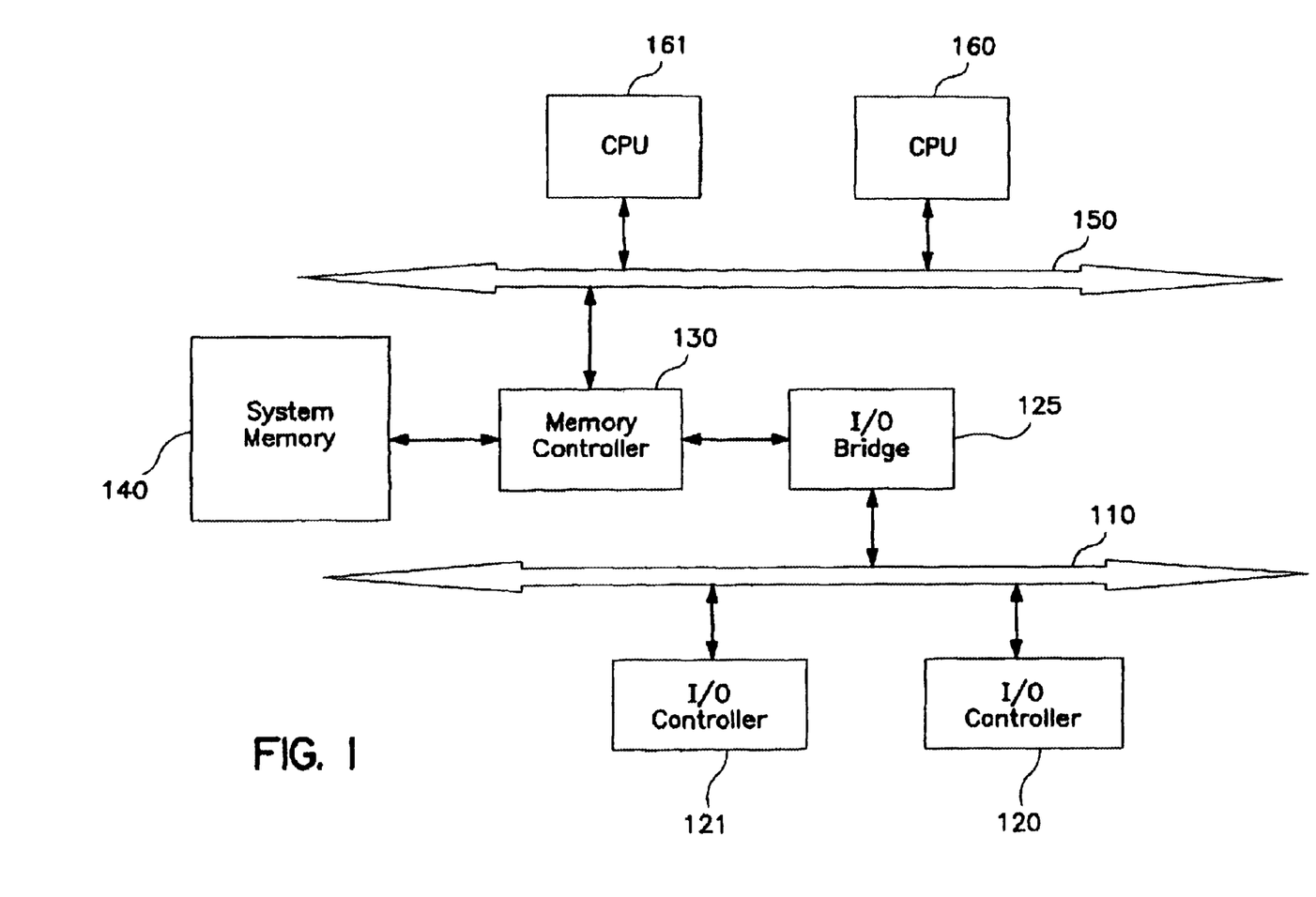
FIG. 1 illustrates a computer with a broadcast multi-point I/O bus system.

Some well known examples of broadcast multi-point buses used in personal computers ("PC's") today include the Industry Standard Architecture (hereinafter "ISA") bus, the Extended ISA (hereinafter "EISA") bus and the Peripheral Component Interconnect (hereinafter "PCI") bus. One such configuration is illustrated in FIG. 1 which includes dual CPUs 160 and 161 that communicate over a system bus 150; dual I/O controllers 120 and 121 that communicate over an I/O bus 110; and a memory controller 130 which provides access to a system memory 140 for the CPUs 160 and 161 as well as for the I/O controllers 120 and 121 (i.e., via I/O bridge 125). I/O controllers 120 and 121 may reside on two I/O cards which physically interface with I/O bus 110 via two separate I/O bus slots.

As stated above, only one I/O controller may transmit data across I/O bus 110 at any given time. Thus, for example, if I/O controller 120 is disposed on a modem attempting to write data to a specified location in system memory 140, it may transmit data across I/O bus 110 only if the bus is currently available (e.g., only if no other controller is currently transmitting data over the bus). If, however, another I/O controller—e.g., I/O controller 121—is using the I/O bus 110, then I/O controller 120 will make a request to use I/O bus 110 (via the particular bus arbitration mechanism in place). Once I/O controller 121 (and/or any other controller) has relinquished control of the bus, I/O controller 120 may then be granted access to I/O bus 110 and may subsequently write/read its data to/from I/O bus 110 (i.e., via I/O bridge 125 and memory controller 130).

There are significant problems associated with the foregoing broadcast multi-point I/O bus configuration. First and foremost, the data transfer rate of these prior art I/O systems has not kept pace with the vast improvements in CPU performance over the past several years. One obvious reason for this disparity is that only a single I/O controller may transmit data over the I/O bus at any given time. Accordingly, referring again to the above example, CPU 160 may be forced to wait for data to be transmitted from I/O controller 120 to system memory 140 before it can access the data or transmit/receive data over I/O bus 110. Computing performance may be severely degraded if I/O controller 120 and/or CPUs 160, 161 are forced to wait for a significant period of time before I/O bus 110 is released. For these reasons, the current broadcast multi-port I/O bus system represents a significant bottleneck to current system performance. Moreover, due to basic transmission line phenomena it is hard to cope with these issues using passive buses. Specifically, phenomena such as transmission line propagation time, skews, reflections, and intersymbol interference do not scale well with semiconductor process shrinks.

Another significant problem with the current I/O bus configuration is that both hot-swapping of bus components and I/O bus fault detection are unreasonably difficult. Hot-swap refers to the ability to remove components while the I/O system is active. While it is possible to execute a planned shutdown to replace a component on the current shared bus configuration, problems arise when a bus component is unexpectedly removed and/or shut down. This is primarily due to the fact that one I/O bus is shared by a number of different components (i.e., there is no way to isolate one portion of the bus). In addition, if the I/O bus is affected by a bus fault all of the components on the I/O bus may likewise be affected.

Finally, scalability is another problem associated with today's I/O bus system, particularly with respect to server configurations. Bus performance simply does not scale well under today's I/O usage models. Servers are generally purchased with the intent to expand as necessary to meet future component demand requirements. Once all the slots on today's I/O bus are occupied, however, there can be little room for additional peripheral expansion.

It should be noted that broadcast buses are not restricted to the passive type described above. For example, they may be extended to be active star/tree configurations (e.g., using bus bridges), such as the Peripheral Component Interface ("PCI") bus. Moreover, prior art relevant to the present application may include systems that are not strictly computers such as, for example, packet processing systems (e.g., those which use switches, routers . . . etc). Unlike computers, these types of systems do not implement memory controllers. Rather, they implement peer to peer packet communication across a network/bus.

For at least the foregoing reasons, an improved I/O system and apparatus is needed.

SUMMARY OF THE INVENTION

An apparatus is described comprising: a switch for providing a plurality of communication channels between a plurality of nodes; and a crossbar switch communicatively coupled between the switch and the nodes for allocating one or more of a plurality of links to each of the nodes.

Additionally, in a system including a switch for providing a plurality of communication channels between a plurality of nodes, a method is disclosed, comprising the steps of: determining bandwidth requirements of each node in the system; and allocating links to the nodes based on the bandwidth requirements.

BRIEF DESCRIPTION OF THE DRAWINGS

A better understanding of the present invention can be obtained from the following detailed description in conjunction with the following drawings, in which.

DETAILED DESCRIPTION OF THE PREFERRED EMBODIMENT

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Flexible Switch-Based I/O System Interconnect

One alternative to the passive broadcast multi-point I/O bus 110 illustrated in FIG. 1 relies on using a plurality of point-to-point links. In this context, the term "link" is used to describe a bi-directional communication path between any two points, or nodes, on the I/O bus. For example, a bus component may communicate with system memory via a dedicated point-to-point link (or, alternatively, the bus component may communicate with a CPU, another bus component . . . etc). Because each bus component has one or more dedicated links of its own, the transmission path allocated to each component is unaffected by data/address transmissions from other components. Thus, components on a bus using point-to-point links may transmit or receive data without first waiting for the I/O bus to be released by another bus component or a CPU (as is the case with the current broadcast I/O bus). The interconnection of system components using point-to-point links has a number of advantages including improved link speed, I/O system capacity, fault tolerance, and dynamic topology changes (e.g., hot swap), some of which are described below.

Figure 2:
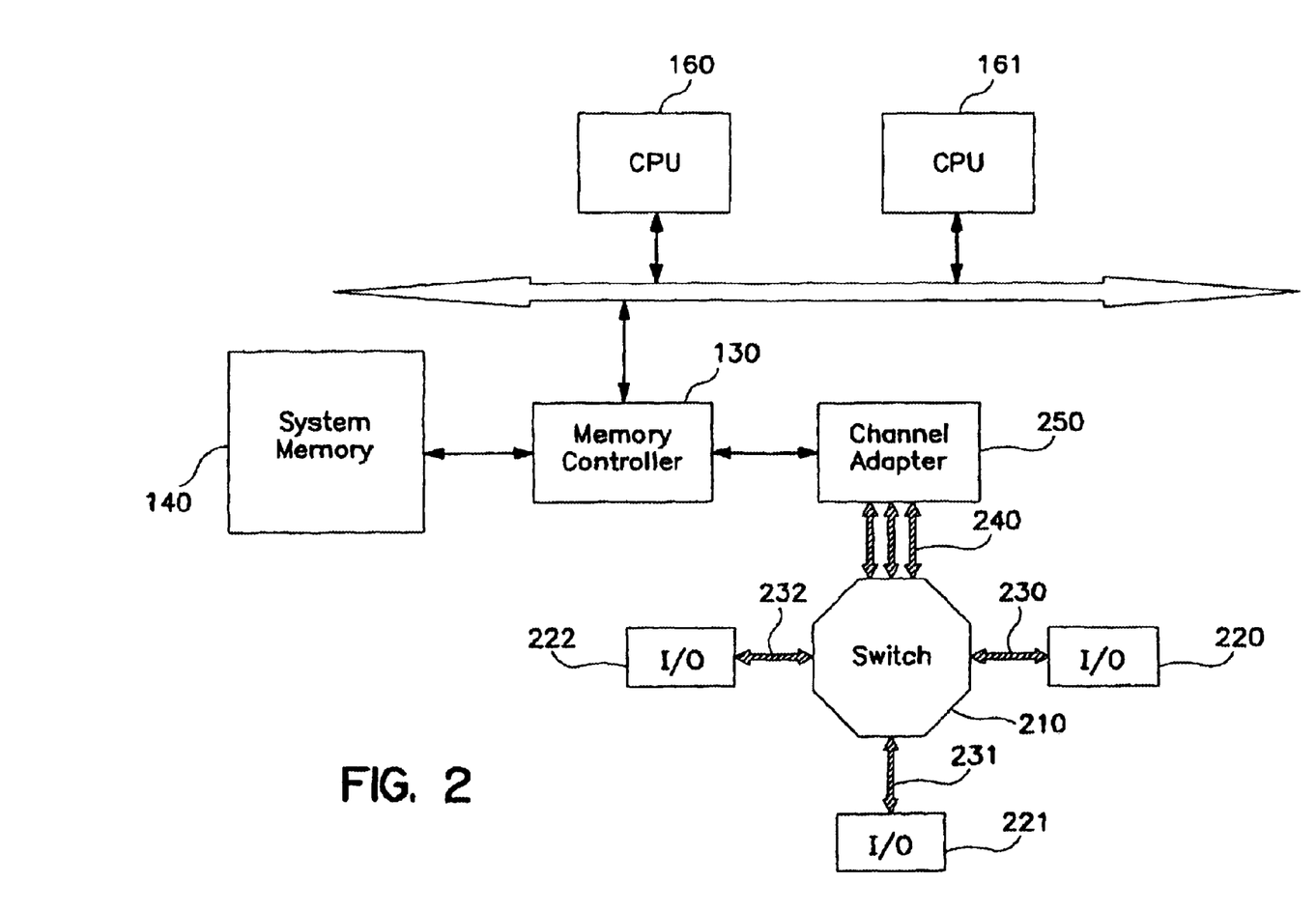
FIG. 2 illustrates a computer system with an I/O bus comprised of a plurality of point-to point links and a switch.

Although it is conceptually possible to provision one point-to-point link between any given pair of bus components, in most cases it is not practical due (in part) to the amount of physical wiring and component complexity required. Therefore, as illustrated in FIG. 2, a switch 210 may be introduced as a device that terminates all point-to-point links and provides packet switching using time division multiplexing capabilities for data transmitted over the links. More particularly, any two components—e.g., I/O controller 222 and I/O controller 220—may establish a dedicated communication channel across the switch 210. Similarly, if I/O controller 222 needs to transmit data to system memory 140, it will establish a dedicated communication channel with channel adapter 250 over switch 210. In this embodiment, link 232 and one of a group of links 240 will support the data transmissions between channel adapter 250 and I/O controller 222.

The channel adapter 250 in this embodiment is an interface into and out of the memory controller 130 of the host computer system. It may include one or more direct memory access (hereinafter "DMA") engines for directly accessing portions of system memory 140. Thus, a dedicated communication channel between the I/O controller 222 and the channel adapter 250 is established over switch 210, the channel adapter 250 will coordinate data transmissions between I/O controller 222 and system memory 140.

In one embodiment of the system illustrated in FIG. 2, buffers are included in switch 210 to provide for the queuing of data. The buffers may improve system performance by de-coupling switch 210 inputs from outputs to some extent (i.e., data can be temporarily buffered as switch 210 proceeds to the next transaction). Buffering also provides a convenient mechanism for rate adaptation (i.e., operating with links of dissimilar speeds) and also solves some of the blocking issues that are introduced whenever switches are used as the main interconnect between system components. For example, external port blocking may occur due to the dynamics of the data traffic being moved (e.g., the transient periods of time during which the traffic patterns into a port exceed the rate of the link attached to that port).

As set forth above, one problem associated with today's broadcast I/O bus configuration, such as the one illustrated in FIG. 1, is that only one component may control the bus at any given time. However, one positive aspect of this configuration is that once a component gains control of the bus, the bus can always deliver its peak bandwidth to that component. By contrast, a problem which arises in a switched point-to-point I/O interconnect, such as the embodiment illustrated in FIG. 2, is that individual bus components (i.e., components represented by I/O controllers 220–222) are limited by the capacity of their individual links (i.e., links 230–232). Although the I/O system capacity—based on the total bandwidth supported by the three links 240 running between the switch 110 and the channel adapter 250—may be designed and provisioned for the maximum I/O bus capacity (i.e., all I/O bus slots populated with components), this maximum capacity cannot be used unless all slots are populated. Accordingly, if I/O controller 220 is removed from the system illustrated in FIG. 2, there is currently no way to recapture the bandwidth which is thereby made available. It would be useful in this situation to be able to distribute this released bandwidth to other components remaining on the I/O bus (e.g., I/O controllers 221 and 222).

In one embodiment of the invention, a crossbar switch 320 (illustrated in FIG. 3) may be included to provide this functionality. In this embodiment, each I/O bus slot may be serviced by a group of links 310–312. The number of links allocated to each group may be equal to the maximum number of links that the entire I/O system (i.e., switch 210 and/or channel adapter 250) can support. It will be assumed for the purpose of explanation that the particular I/O bus illustrated in FIG. 3 includes three I/O bus slots, each of which is populated with an I/O controller 220–222. It should also be noted that the terms "I/O controller," "I/O controller card," and "I/O card" are used interchangeably herein.

Figure 3:
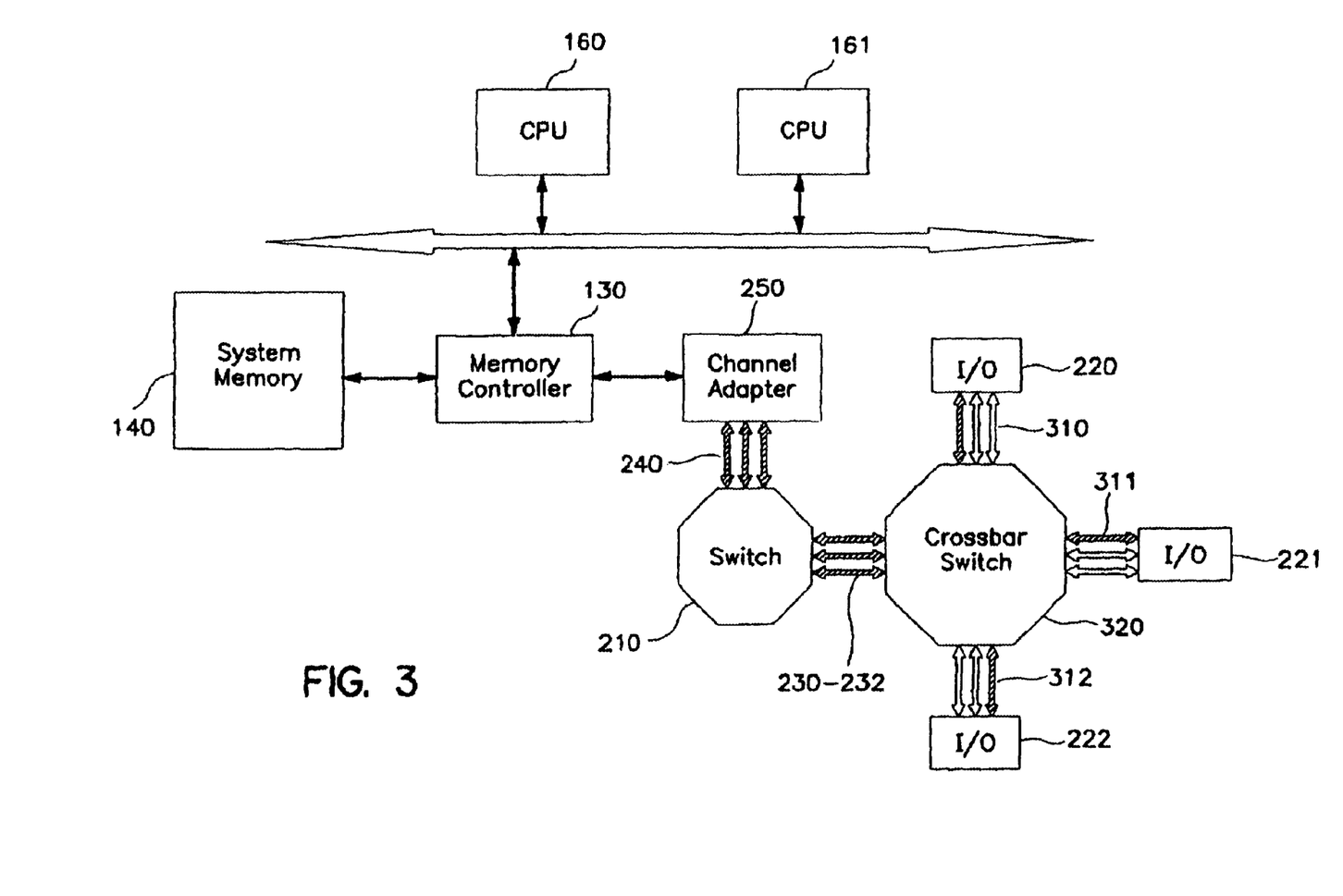
FIG. 3 illustrates the computer system of FIG. 2 including a crossbar switch for allocating links.

Crossbar switch 320 in this embodiment couples each of the original set of links 230–232 originating from switch 210 to one or more of the links disposed in each group of links 310–312. Accordingly, crossbar switch performs space division switching between the various I/O system links. The active links in link groups 310–312 illustrated in FIG. 3 (i.e., the links which are highlighted) have each been coupled to one of the links 230–323 originating from switch 210. Conversely, the links in the group of links 310–312 which are inactive (i.e., the links that are not highlighted) have not been coupled to links 230–232 by crossbar switch 320. Thus, the specific link allocation illustrated in FIG. 3 is the same as that illustrated in FIG. 2: three I/O controller cards 220–222 are each supplied with a single active link.

Figure 4:
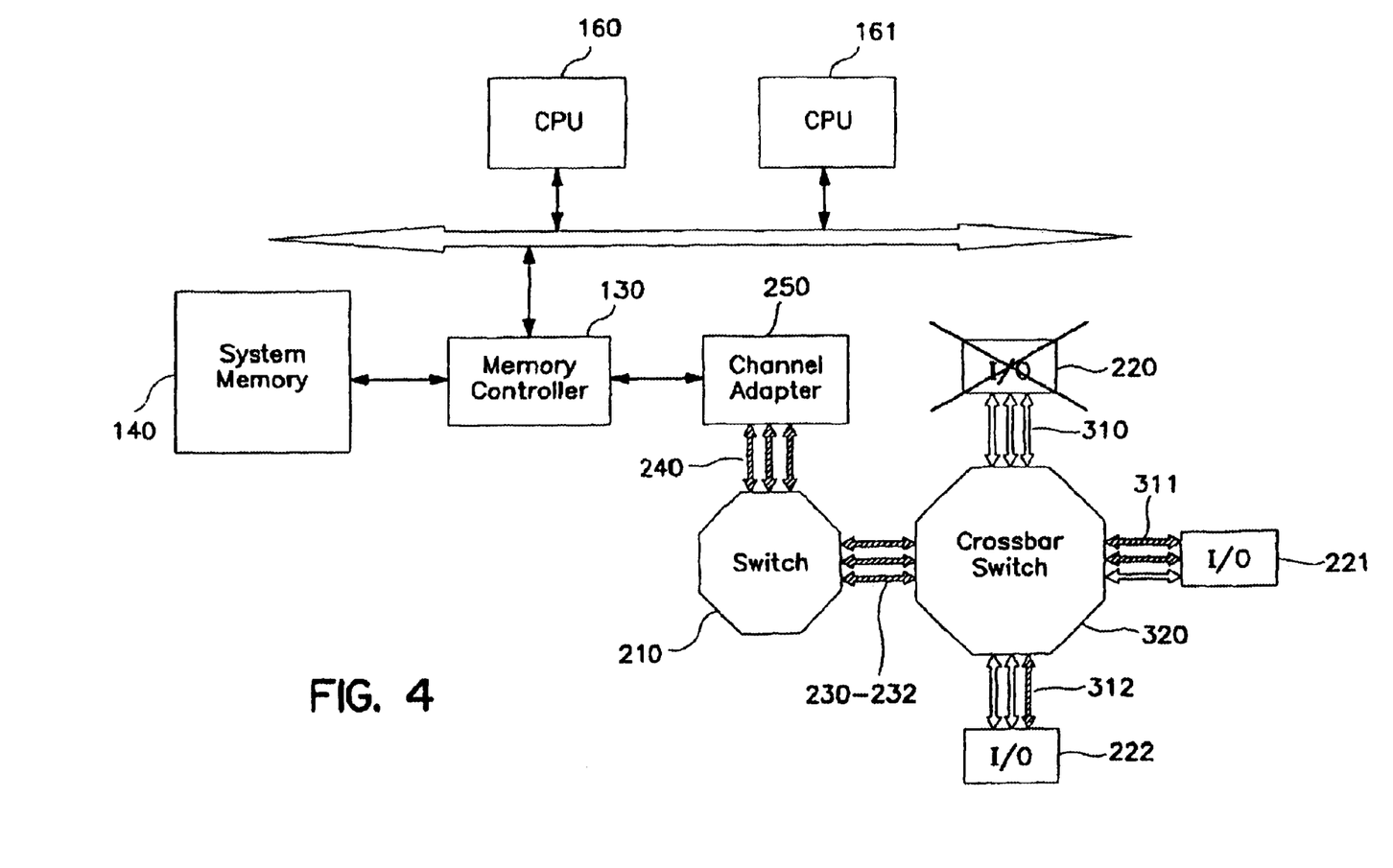
FIG. 4 illustrates how link bandwidth may be reallocated under one embodiment of the invention.

As illustrated in FIG. 4, however, when one of the three I/O controller cards 220–222 is removed from its corresponding bus slot, the benefits of crossbar switch 320 can be more fully appreciated. Specifically, when I/O controller card 220 is removed from the system, the active link of link group 310 (which the crossbar switch had previously allocated to controller card 220) will no longer be needed to service I/O controller 220. Accordingly, the crossbar switch 320 may deactivate this link. As a result, the full system bandwidth (i.e., based on the bandwidth supplied by links 230–232 and link group 240 originating from switch 210) is no longer being utilized. However, due to the fact that each of the individual I/O controller card slots in this embodiment is provided with a plurality of links (three in the example), crossbar switch 320 may activate one additional link in either link group 311 or link group 312. As illustrated in FIG. 4, an additional link in link group 311 is activated and the bandwidth provided to I/O controller card 221 is thereby increased. The overall system bandwidth (based on the bandwidth of links 230–232 and link group 240) remains constant.

In contrast to the embodiments of the invention described above with respect to FIGS. 3 and 4, when I/O card 220 is removed from the system illustrated in FIG. 2, there is no way for the full bandwidth capacity of the I/O system to be utilized. This is because the system has no mechanism for re-allocating the bandwidth associated with the inactive link 230 to a link of one of the remaining I/O slots. Overall I/O performance will not be affected if the remaining I/O controller cards 221 and 222 are only capable of communicating at the speed of a single link. However, if one or both of the remaining cards 221, 222 is capable of communicating at a bandwidth greater than the bandwidth of a is single link, then overall I/O system bandwidth will be wasted. In sum, the addition of crossbar switch 320 provides for a more efficient allocation of active links within the I/O system.

In one embodiment of the invention, control logic associated with crossbar switch 320 will query each I/O slot on the bus upon system initialization (and/or periodically thereafter). If there is no card present in a particular I/O bus slot, then no active links will be allocated to that slot. If a card is present in the I/O bus slot, however, then the number of links to be activated for that slot will depend on the bandwidth required by the particular I/O card. For example, if the I/O card is a high speed network card (e.g., a gigabit Ethernet card) then more than one link may be activated to support the high data transfer rate required for the card to run at peak bandwidth. Similarly, if the card is an I/O card for coupling together the I/O systems of two or more computers (referred to as "clustering") then more than a single link may be appropriate due to the high speed nature of the connection. However, if the I/O card is merely a modem communicating at, for example, 56K-baud, then only a single link may be allocated to the particular I/O card slot (i.e., a single link will supply more than enough bandwidth to handle the highest possible data transfer rate of the modem). In another embodiment of the invention, each I/O card may request a particular bandwidth (or, alternatively, a specified number of links) upon receiving a query from the control logic. For example, the high speed network card described above may request two or more links to handle its high bandwidth requirements (of course, the actual number of links activated depends on the bandwidth supplied by each link). If a sufficient number of links are available for allocation, then the control logic in this embodiment may cause crossbar switch 320 to activate the requested number of links to the slot in which the high speed network card is situated.

Figure 7:
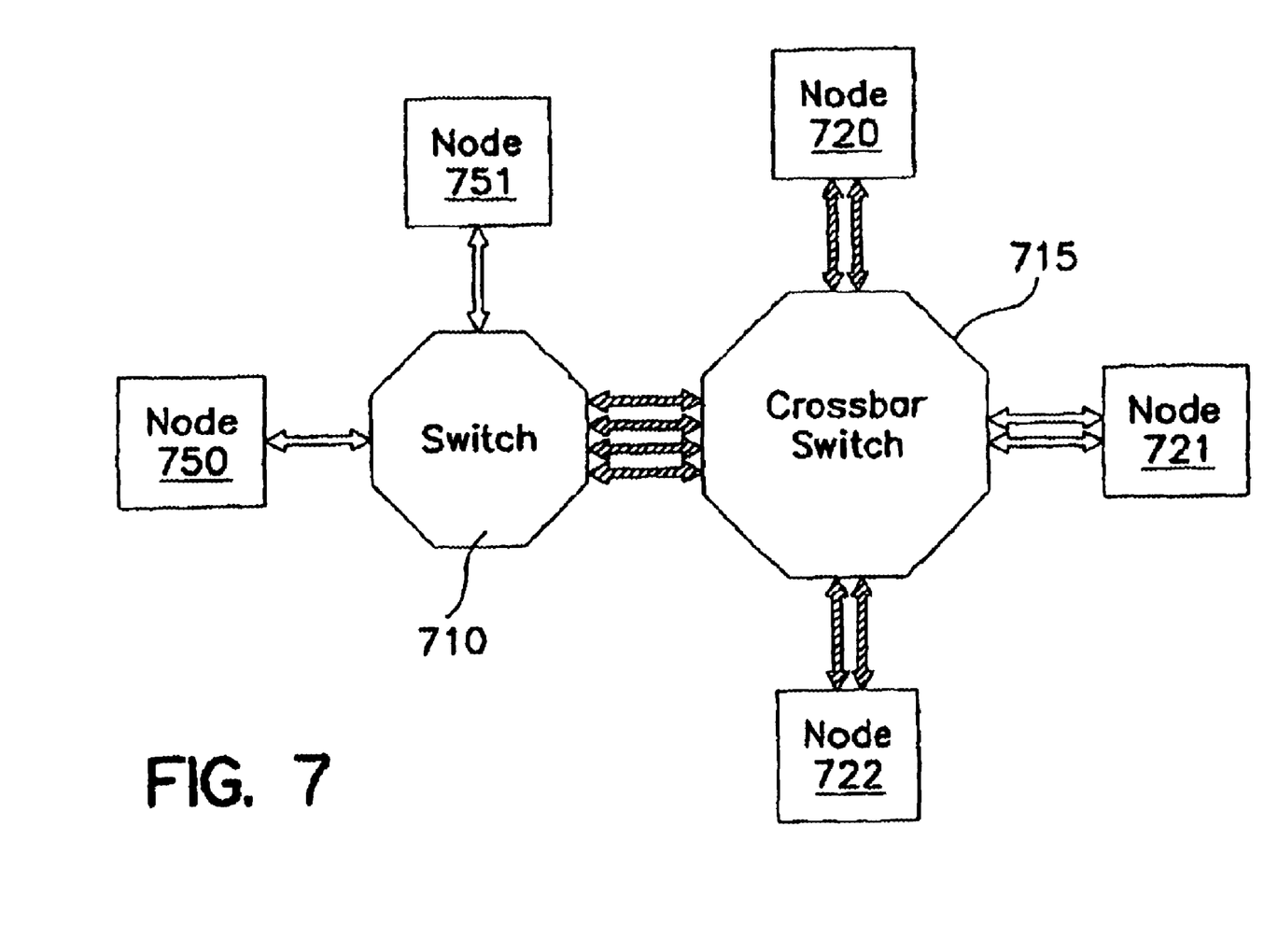
FIG. 7 illustrates a plurality of nodes communicatively coupled to a switch via a crossbar switch which allocates links.

As illustrated in the embodiment in FIG. 7, the underlying principles of the present system and method may be implemented without the presence of a memory controller or a memory. Specifically, FIG. 7 illustrates a plurality of nodes 720–722 (e.g., network nodes) which establish dedicated communication channels between one another over switch 710. As with previously-described embodiments, a crossbar switch 715 may be configured between each one of the nodes 720–722 and switch 710 to dynamically assign additional links to each node as dictated by the bandwidth requirements of the node. Accordingly, as shown in FIG. 7, if only two nodes—node 720 and node 722—are communicating across switch 710, then crossbar switch 715 may assign additional links to each node 720, 722 (two illustrated in FIG. 7). Accordingly, links may be provisioned dynamically to provide the most efficient bandwidth (i.e., link) allocation for the system.

In addition, as illustrated in FIG. 7, some nodes (e.g., nodes 750 and 751) may be directly coupled to switch 710. These nodes 750, 751 may communicate to nodes 720–722 over crossbar switch 715 or to one another across switch 710.

Figure 5:
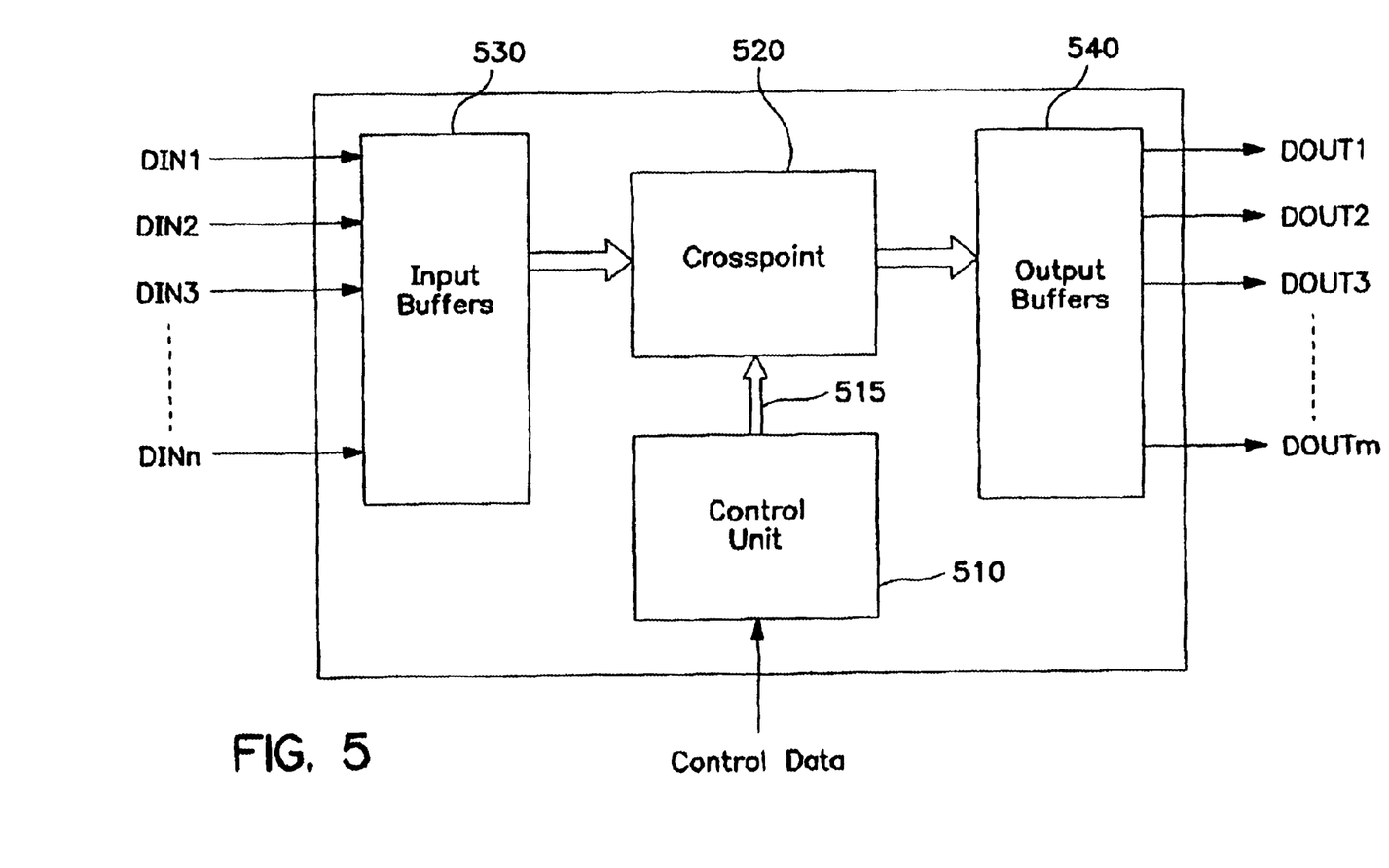
FIG. 5 illustrates a particular crossbar switch used in one embodiment of the invention.

FIG. 5 illustrates a specific crossbar switch and associated control logic which may be implemented in one embodiment of the invention. In this embodiment, a plurality of link inputs may be coupled to input ports DIN1 through DINn, which are coupled to a plurality of input buffers 530. A crosspoint unit 520 will couple the inputs DIN1 through DINn with one or more outputs, DOUT1 though DOUTm (with one or more output buffers 540 coupled in between). The particular coupling of inputs to outputs will depend on control signals 515 transmitted from control unit 510.

The control signals 515 transmitted by control unit 510 are based on external control data received by control unit 510. For example, as described above, this control data may include information on which I/O slots are occupied by I/O cards. If a particular slot is not occupied with an I/O card, then the links to that slot may not be activated (i.e., the inputs and outputs of the links will not be coupled to the I/O system via crosspoint unit 520). The control data may also include specific information on the bandwidth requirements of each I/O card on the I/O system. Thus, after control unit 510 queries each I/O slot, I/O cards which request higher bandwidth requirements (e.g., high speed network cards) may be allocated additional active links via crosspoint unit 520. Control unit 510 may configure crosspoint unit 520 in this manner upon I/O system initialization and/or at predetermined intervals thereafter. Control unit 510 may also reconfigure crosspoint 520 whenever an I/O card is added or removed from the I/O system, thereby continually ensuring the most efficient active link allocation.

Figure 6:
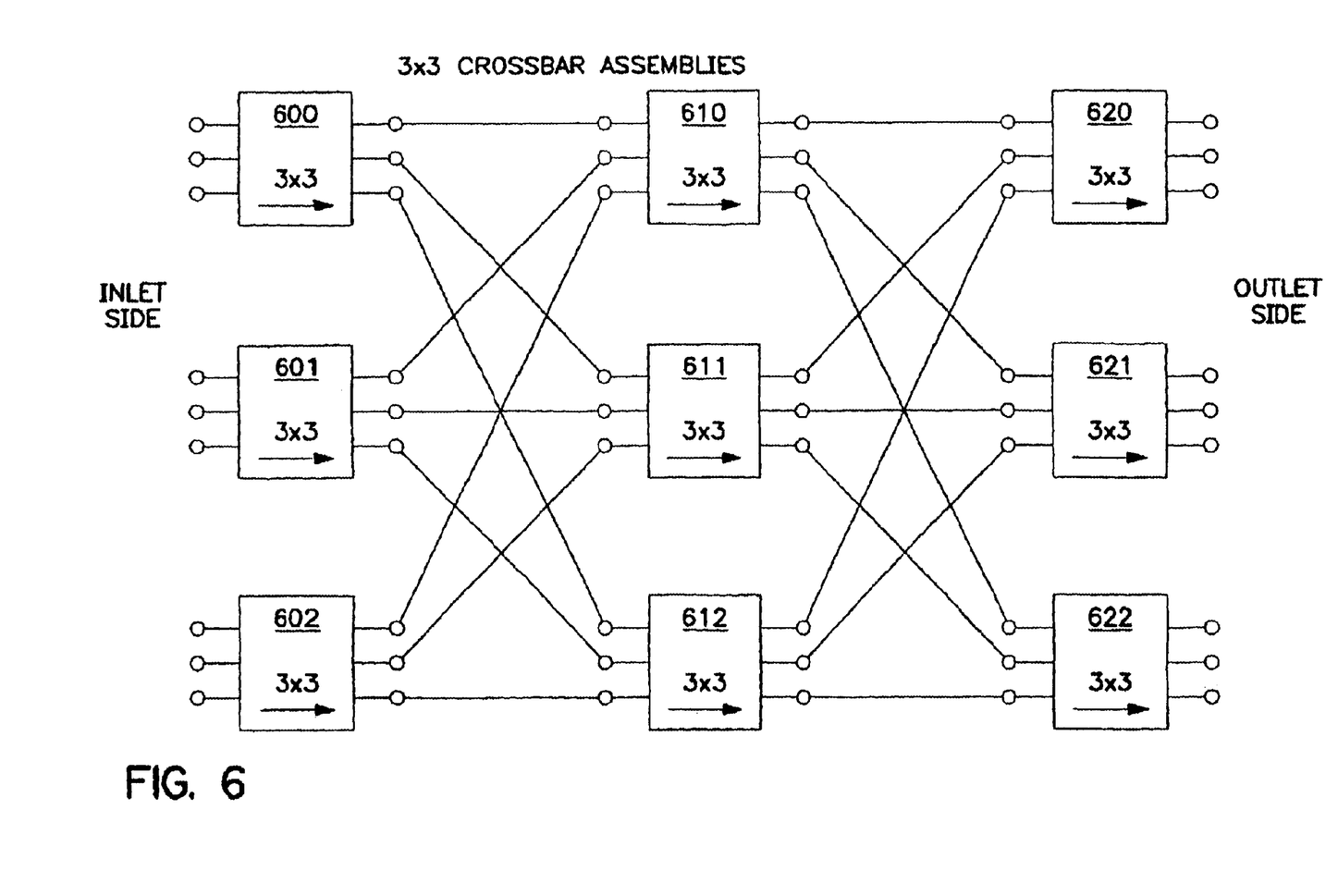
FIG. 6 illustrates a multistage crossbar switch used in one embodiment of the invention.

In another embodiment of the invention, crossbar switch 320 is a multi-stage switch. FIG. 6 illustrates one example of such a design. The switching matrix illustrated in FIG. 6 uses a plurality of 3×3 crossbar assemblies to connect 9 inlets to 9 outlets. Of course, depending on the particular implementation, various numbers of inputs and outputs may be used. The interconnect of the stages is done so that each of the three outlets of a single crossbar assembly connects to a different crossbar assembly of the succeeding stage, and each of the three inlets of a single crossbar assembly connect to a different crossbar assembly of the preceding stage. Crossbar assemblies 600, 601, and 602 form the first stage; crossbar assemblies 610, 611, and 612 form the second stage; and crossbar assemblies 620, 621, and 622 form the third stage.

Multistage switch designs such as the one illustrated in FIG. 6 provide several advantages over single stage designs. First, by sharing the use of crosspoints in the middle section (i.e., crossbar assemblies 610–612), the total number of crosspoints required for equivalent service is reduced. This reduction is substantially more attenuated in larger switches which may include several hundred inputs and outputs (and which are more typical than the 9×9 switch of FIG. 6, used primarily for purposes of illustration). A second significant benefit is that by virtue of this sharing of the middle section crosspoints, multiple paths exist between any inlet point and any outlet point. This multiple routing capability allows the switch to work around localized incidences of failures.

FIGS. 3 through 7 illustrate specific embodiments contemplated within the scope of the present invention. However, it should be noted that the specific configurations illustrated in these figures and described in the accompanying text of the specification are not necessary for implementing the underlying principles of the invention; they are merely a small number of possible embodiments. Accordingly, the scope and spirit of the present invention should be judged in terms of the claims which follow.

What is claimed is:

1. An apparatus comprising:
   a first switch for performing time division multiplexing on a plurality of links in an I/O system, a first group of said plurality of links communicatively coupled to a memory controller via an interface;
   a second switch for communicatively coupling a second group of links in said plurality of links to a third group of links;
   two or more I/O slots, each communicatively coupled to two or more of said third group of links; and
   control logic for determining whether one or more of said I/O slots contains an I/O component,
      wherein said control logic causes said second switch to communicatively couple one or more of said third group of links communicatively coupled to a particular I/O slot to one or more of said second group of links only if said I/O slot contains an I/O component.

2. The apparatus as claimed in claim 1 wherein said control logic determines the maximum bandwidth at which said I/O component can transmit data, and causes said second switch to couple more than one of said third group of links communicatively coupled to said I/O slot to more than one of said second group of links if said I/O component can transmit at a peak bandwidth which is higher than that which can be transmitted over a single link.

3. The apparatus as claimed in claim 2 wherein said control logic makes its determinations by querying said I/O components in said I/O slots.

4. The apparatus as claimed in claim 3 wherein said control logic queries said I/O components upon system initialization.

5. The apparatus as claimed in claim 3 wherein said control logic queries said I/O components when one or more of said components are added/removed from the I/O system.

6. The apparatus as claimed in claim 5 wherein said control logic reallocates one or more of said second set of links from a first I/O slot to a second I/O slot when one of said I/O components is removed from said first I/O slot.

7. The apparatus as claimed in claim 1 wherein said control logic receives a request for a specified number of links from an I/O component in an I/O slot, and causes said second switch to communicatively couple said specified number of links from said third group of links communicatively coupled to said I/O slot to an equivalent number of links in said second group of links.

8. The apparatus as claimed in claim 1 wherein said second switch is a crossbar switch.

9. An apparatus comprising:
   a plurality of I/O slots for receiving I/O components, one or more of said I/O slots communicatively coupled to a plurality of I/O slot links;
   a crossbar switch for communicatively coupling said I/O slot links to a second plurality of links;
   a buffered switch for communicatively coupling links in said second plurality of links to links in a third plurality of links and also to other links in said second plurality of links; and
   control logic for determining whether an I/O slot contains an I/O component and causing said crossbar switch to communicatively couple one or more of said I/O slot links communicatively coupled to said I/O slot to one or more of said second plurality of links only if said I/O slot contains an I/O component.

10. The apparatus as claimed in claim 9 wherein said third plurality of links is communicatively coupled to a computer memory controller via an interface.

11. The apparatus as claimed in claim 9 wherein said buffered switch is a time division multiplexed switch.

12. The apparatus as claimed in claim 2 wherein said control logic causes said crossbar switch to communicatively couple more than one of said second plurality of links to more than one of said I/O links communicatively coupled to a particular I/O slot if said I/O component has a peak data transmission capacity greater that the capacity of a single I/O link.

13. The apparatus as claimed in claim 9 wherein said crossbar switch includes buffer.

14. An apparatus comprising:
   time division switching means for performing time division switching on a plurality of links in an I/O system, a first group of said plurality of links communicatively coupled to a memory controller via an interface;
   crossbar switching means for communicatively coupling a second group of links in said plurality of links to a third group of links;
   two or more I/O slots, each communicatively coupled to two or more of said third group of links; and
   control means for determining whether one or more of said I/O slots contains an I/O component, wherein said control means causes said crossbar switching means to communicatively couple one or more of said third group of links communicatively coupled to a particular I/O slot to one or more of said second group of links only if said I/O slot contains an I/O component.

15. The apparatus as claimed in claim 14 wherein said control means determines the maximum bandwidth at which said I/O component can transmit data, and causes said crossbar switching means to couple more than one of said third group of links communicatively coupled to said I/O slot to more
than one of said second group of links if said I/O component can transmit at a peak bandwidth which is higher than that which can be transmitted over a single link.

16. An apparatus comprising:
a switch for providing a plurality of communication channels between a plurality of nodes; and
a crossbar switch communicatively coupled between said switch and said nodes for allocating one or more links of a set of links independently coupled to each of said nodes, wherein said plurality of nodes are input/output (I/O) slots each for coupling to an I/O card, and a specific number of links of the set of links are allocated to each said node based on specific bandwidth requirements for each said node.

17. The apparatus as claimed in claim 16 wherein said crossbar switch allocates a number of said links to one of said nodes based on the bandwidth requirements of said node.

18. The apparatus as claimed in claim 17 wherein said number of links allocated to one of said nodes is further based on overall switch bandwidth.

19. In a system including a switch for providing a plurality of communication channels between a plurality of nodes, a method comprising:
determining the bandwidth requirements of each node in said system;
determining a number of links in a set of links independently coupled to each node necessary to be allocated based on said bandwidth requirements of each node; and
allocating said determined number of links to each of said nodes.

20. The method as claimed in claim 19 wherein said nodes are I/O card slots into which I/O cards may be seated.

21. The method as claimed in claim 19 further comprising:
reallocating said set of links coupled to each ode when one or more of said nodes becomes inactive.

22. The method as claimed in claim 19, further comprising:
reallocating said number of links when the bandwidth requirements of one or more of said nodes changes.

23. An apparatus comprising:
a first switching means for performing time division multiplexing on a plurality of links in an I/O system, a first group of said plurality of links communicatively coupled to a memory controller via an interface;
a second switching means for communicatively coupling a second group of links in said plurality of links to a third group of links;
two or more I/O slots, each communicatively coupled to two or more of said third group of links; and
control means for determining whether one or more of said I/O slots contains an I/O component,
wherein said control means causes said second switching means to communicatively couple one or more of said third group of links communicatively coupled to a particular I/O slot to one or more of said second group of links only if said I/O slot contains an I/O component.

24. The apparatus as claimed in claim 23 wherein said control means determines the maximum bandwidth at which said I/O component can transmit data, and causes said second switching means to couple more than one of said third group of links communicatively coupled to said I/O slot to more than one of said second group of links if said I/O component can transmit at a peak bandwidth which is higher than that which can be transmitted over a single link.

25. The apparatus as claimed in claim 24 wherein said control means makes its determinations by querying said I/O components in said I/O slots.

26. The apparatus as claimed in claim 25 wherein said control means queries said I/O components upon system initialization.

27. The apparatus as claimed in claim 25 wherein said control means queries said I/O components when one or more of said components are added/removed from the I/O system.

28. The apparatus as claimed in claim 27 wherein said control means reallocates one or more of said second set of links from a first I/O slot to a second I/O slot when one of said I/O components is removed from said first I/O slot.

29. The apparatus as claimed in claim 23 wherein said control means receives a request for a specified number of links from an I/O component in an I/O slot, and causes said second switching means to communicatively couple said specified number of links from said third group of links communicatively coupled to said I/O slot to an equivalent number of links in said second group of links.

30. The apparatus as claimed in claim 23 wherein said second switching means is a crossbar switch.

* * * * *